United States Patent [19]

Burgess et al.

[11] 3,945,573
[45] Mar. 23, 1976

[54] FLEXIBLE DUCT ASSEMBLIES

[75] Inventors: Brian Burgess; Raymond Terence Bayliss, both of Bewdley; Peter Bryan Stokes, Halesowen; George Thomas Eynon, Farnborough, all of England

[73] Assignee: Imperial Metal Industries (Kynoch) Limited, Birmingham, England

[22] Filed: Sept. 7, 1973

[21] Appl. No.: 395,169

Related U.S. Application Data

[63] Continuation-in-part of Ser. No. 220,621, Jan. 25, 1972, abandoned.

[30] Foreign Application Priority Data
Mar. 1, 1973 United Kingdom............... 10049/73

[52] U.S. Cl. ............. 239/265.35; 60/232; 285/265
[51] Int. Cl.².................... B64C 15/08; F16L 27/06
[58] Field of Search.......... 239/265.35, 587, 265.11, 239/265.19, 265.33, 265.37; 60/228, 232, 39.31, 39.5; 285/223, 265

[56] References Cited
UNITED STATES PATENTS

| | | | |
|---|---|---|---|
| 3,106,061 | 10/1963 | Eder ......................... | 239/265.35 X |
| 3,157,028 | 11/1964 | Gaubatz........................ | 239/265.35 |
| 3,275,243 | 9/1966 | Gaubatz........................ | 239/265.35 |
| 3,390,899 | 7/1968 | Herbert et al. ............ | 239/265.35 X |
| 3,519,260 | 7/1970 | Irwin............................ | 239/265.35 X |
| 3,680,895 | 8/1972 | Herbert et al. ................ | 285/223 X |
| 3,727,843 | 4/1973 | Parilla........................... | 239/265.35 |
| 3,759,446 | 9/1973 | Bligh et al...................... | 239/265.35 |
| 3,811,713 | 5/1974 | Barrett et al..................... | 60/232 X |

*Primary Examiner*—John J. Love
*Assistant Examiner*—Andres Kashnikow
*Attorney, Agent, or Firm*—Cushman, Darby & Cushman

[57] ABSTRACT

A flexible duct assembly comprising axially first and second duct parts, a mounting system adjustably supporting the second duct part with respect to the first duct part, a primary seal between complementary relatively movable surfaces of the first and second parts, and a secondary seal between the first and second duct parts, the secondary seal being afforded protection from the interior of the duct assembly by the primary seal. The secondary seal may be an annular sliding seal or an annular strip of elastomeric material bonded on opposite sides to relatively movable facing surfaces of the first and second parts.

8 Claims, 3 Drawing Figures

FLEXIBLE DUCT ASSEMBLIES

This application is a continuation-in-part of application Ser. No. 220,621, filed Jan. 25, 1972 now abandoned.

BACKGROUND OF THE INVENTION

This invention relates to flexible duct assemblies. The invention is especially concerned with exhaust nozzle assemblies particularly, but not exclusively, for rocket motors, for example rocket motors using solid propellants.

It is an object of the present invention to provide an improved flexible duct assembly. It is a subsidiary object of an embodiment of the present invention to provide an exhaust nozzle assembly which is adjustable to alter the thrust vector produced by the nozzle, and thereby provide guidance for a missle to which the nozzle assembly is attached.

SUMMARY OF THE INVENTION

In accordance with the present invention a flexible duct assembly comprises axially first and second duct parts, a mounting system adjustably supporting the second duct part with respect to the first duct part for rotation with respect to a center fixed relative to the first duct part a primary seal between complementary relatively movable surfaces of the first and second parts, and a secondary seal between the first and second duct parts, the secondary seal being afforded protection from the interior of the duct assembly by the primary seal.

In a first embodiment the secondary seal includes an annular seal member mounted on one of the duct parts and slidable over a curved surface centered on said fixed center and formed on the other of the duct parts, and preferably the sealed member and the curved surface are symmetrical about a plane perpendicular to the longitudinal axis of the duct part on which is formed the curved surface, said plane containing the fixed center.

In a second embodiment the secondary seal includes an elastomeric strip bonded on opposite sides to relatively movable facing surfaces of the first and second parts. Preferably the elastomeric strip is bonded between facing surfaces of the first and second duct parts in shear. Preferably also the second duct part is adjustable relative to the first duct part about a center located on the longitudinal axis of the duct assembly, and the elastomeric strip is symmetrical about a plane perpendicular to said axis and containing said center.

In both embodiments it is preferable that the primary seal be constituted by complementary frusto-concavo and frusto-convexo surfaces centered upon said center. Preferably the mounting system comprise a gimbal ring centered upon said center to permit angular adjustment of the second duct part with respect to the first duct part, and actuation means for providing and controlling said angular adjustment. Preferably, also, the flexible duct assembly constitutes an exhaust nozzle assembly, the first duct part is an axially inner nozzle part, and the second duct part is an axially outer nozzle part.

The invention also provides a rocket motor having an exhaust nozzle in the form of the flexible duct assemblies summarized above.

BRIEF DESCRIPTION OF THE DRAWINGS

Typical examples of the invention will now be described with reference to the accompanying diagrammatic drawings in which.

DESCRIPTION OF THE PREFERRED EMBODIMENTS

Figure 1:
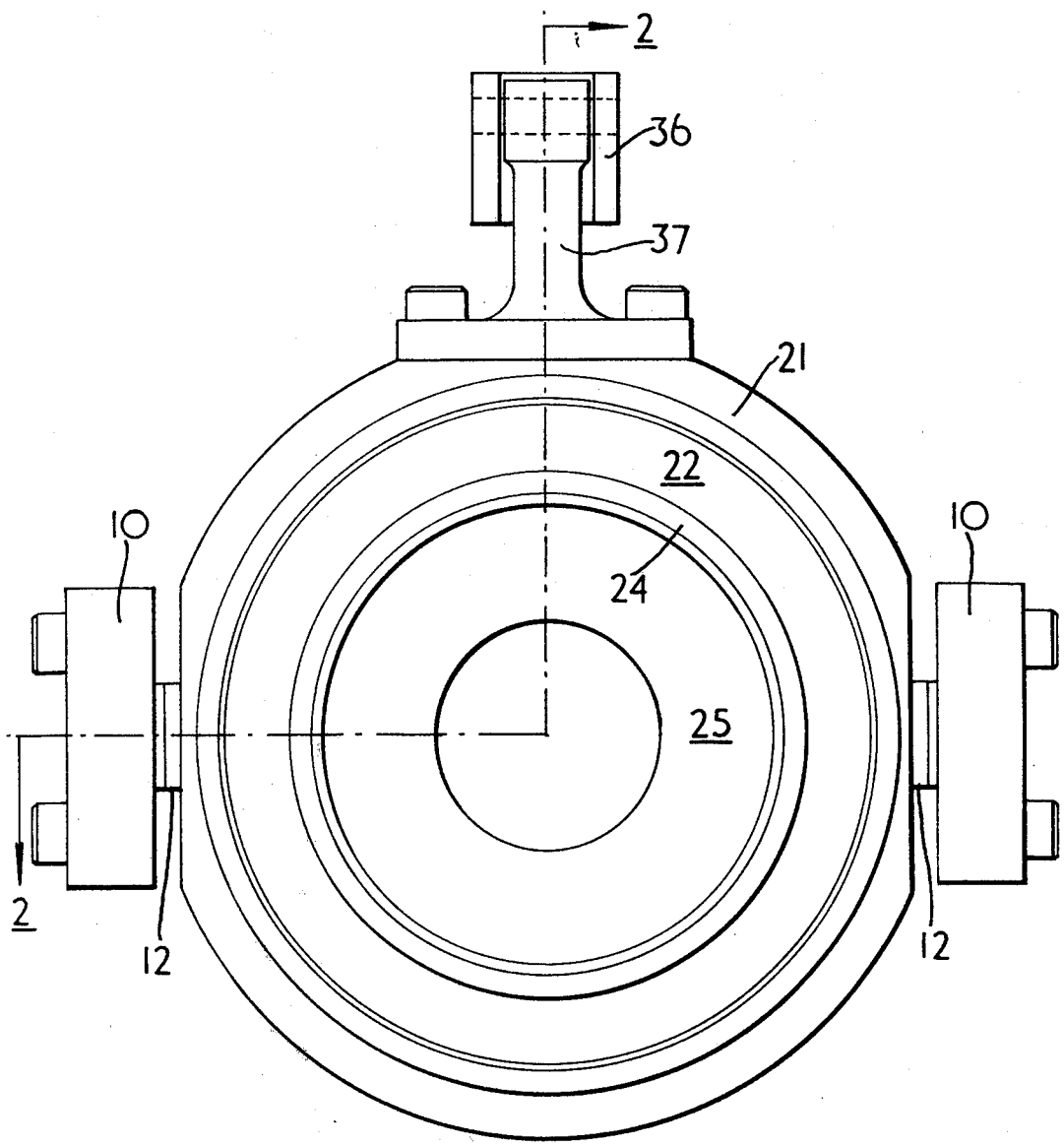
FIG. 1 is an end elevation of the preferred embodiment of a flexible duct assembly constituted by an exhaust nozzle assembly.
Figure 2:
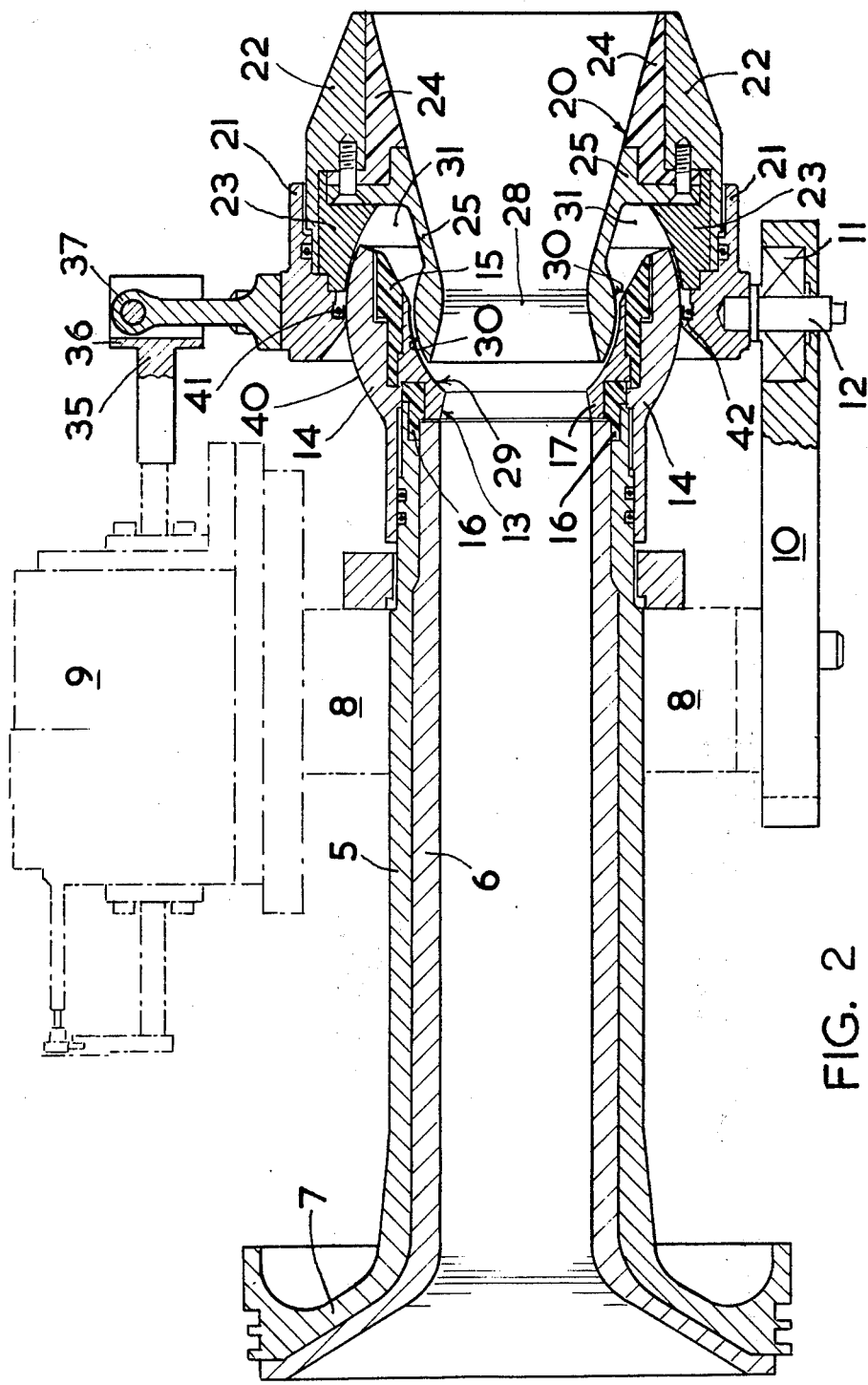
FIG. 2 is a staggered section taken along the line 2—2 on FIG. 1.

Referring to the drawings, and in particular to FIG. 2, there is shown a solid propellant rocket motor blast pipe 5 of which the inner surface is lined at 6 with "Durestos"; this is a phenolic resin filled with asbestos fiber. The left-hand end of the blast pipe 5, as shown in the drawing, is flared radially outwardly at 7 and is fitted to a rocket motor body by conventional means (not shown).

The right-hand end of the blast pipe 5 carries a support ring 8 which mounts an actuating unit 9 and a pair of radially opposed mounting arms 10. Each arm 10 carries a bearing 11 receiving a corresponding trunnion 12.

The right-hand end of the blast pipe 5 also carries an axially inner nozzle part 13 which comprises a steel support 14 of which the radially inner surfaces are provided with "Durestos" rings 15 and 16 respectively. Rings 15 and 16 support an annular molybdenum shield 17.

The trunnions 12 extend radially outwardly from an axially outer nozzle part 20 which comprises a steel support ring 21 on to the inner surface of which is secured a nozzle support ring 22. The axially outer nozzle part 20 also comprises Durestos rings 23 and 24 which thermally separate the steel parts 21 and 22 from a molybdenum choke ring 25.

The axially inner nozzle part 13 is fixed to the blast pipe 5 and through the radially inner surface of the molybdenum shield 17 commences the choke of the rocket nozzle. The choke is completed by the radially inner surface of the molybdenum choke ring 25. The remainder of the nozzle is constituted by the frusto-conical extension of the molybdenum choke ring 25 and the contiguous axially inner surface of the Durestos ring 24. The choke ring 25, together with the remainder of the axially outer nozzle part is angularly adjustable to effectively deviate the rocket nozzle and change the vector of the thrust produced by the passage of hot exhaust gases through the interior thereof.

The angular adjustment referred to above necessitates seals between the relatively movable parts to prevent loss of pressure within the nozzle and minimize the thermal and erosive effects of gases penetrating from the nozzle between those parts. Thus there is provided a primary proximity seal by contouring the molybdenum shield 17 to have a frusto-concavo surface 29 centered upon the point 28 located on the longitudinal axis of the nozzle and about which is displaced the axially outer nozzle part 20. Similarly there is provided on the choke ring 25 a complementary frusto-convexo surface 30, such that the surface 30 is also centered on the point 28. The surfaces 29 and 30 are in close juxtaposition to one another but are arranged in such a way that contact, and thereby frictional resistance, is avoided. However, the degree of overlap between the surfaces 29 and 30, which will vary at different angular positions around the nozzle according to the relative angular positions of the nozzle parts 13 and 20, provide a proximity seal 30a that reduces the amount and velocity of high pressure, high temperature and erosive gas that can penetrate to a cavity 31 between the parts 13 and 20.

There is also provided a secondary seal comprising a part-spherical convex surface 40 formed on the external surface of the steel support 14 and symmetrically disposed with relation to the center 28. The secondary seal also comprises an annular sliding seal 41 which is mounted on the steel support ring 21 at a position symmetrical about the center 28 and pressing against and slidable over the convex surface 40. A suitable sliding seal is in the form of an annulus preferably of polytetrafluoroethylene of U-shaped cross-section with the base and open mouth of the U forming the two planar sides of the annulus, the U receiving a helical spring which extends around the annulus and tends to deflect the inner and outer faces of the seal away from one another. The seal 41 is snapped into an annular groove 42 in the steel support ring 21 with the open side of the U forming the cavity 31. Gases penetrating the primary seal into the cavity 31 assist the action of the spring in pressing the inner and outer faces of the seal 41 into sealing engagement with the convex surface 40 and the steel support ring 21 respectively whilst the seal 41 can slide with the ring 21 over the convex surface 40 with deflection of the nozzle. The resistance to movement is greatly diminished in comparison with the rubber block 32 of the Patent Application referred to above.

In use, the axially outer nozzle part 20 is angularly adjusted with respect to the inner nozzle part 13 and the blast pipe 5 to provide the required thrust vector. Angular displacement of the thrust vector of at least 20° is possible. Adjustment is effected through the actuating unit 9 which via a linkage 35 and a saddle 36 can displace a spur 37 upstanding from the support ring 21 midway between the trunnions 12. This provides turning of the nozzle part 20 about the trunnion bearings 11. The saddle 36 can readily be modified to pull the spur 37 towards the unit 9 to effect turning in the opposite sense. The proximity seal 30a provided between the surfaces 29 and 30 has sufficient overlap between those surfaces to provide a seal even at the maximum displacement possible. In addition, the sliding seal 41 will maintain a seal between parts 13 and 20.

In the drawings and the description given above, the support ring 21 is located through the trunnions 12 in fixed arms 10. This provides angular adjustment in one plane alone. It may be preferred for the arms 10 to be replaced by a gimbal ring mounted on suitable means in a plane perpendicular to the plane of the trunnions 12. With a second actuating unit, this provides angular adjustment in a second plane perpendicular to the first, and through combinations between two planes, in any angle. If required the gimbal system or the arms 10 may be replaced by four actuator units located at 90° spacing around the periphery of the nozzle and operated in complementary diametrically opposite pairs in order to provide adjustment in all directions whilst preventing axial displacement relative between the parts 13 and 20.

In a modification of the typical example described above, the invention is applied to a flexible duct assembly for transmitting domestic or industrial fluids other than hot exhaust gases as described for rocket motors. Thus, in this modification, the axially inner nozzle part becomes an axially first duct part and is connected to preceding piping for transmitting any desired fluid, be it gas or liquid. The outer nozzle part described above becomes a second duct part and is connected by suitable piping for onward transmission of the fluid. The relative movement between the first and second duct parts can provide for thermal movements of the piping and can be used to impart flexibility either for that purpose or for example for reducing thermal and/or vibration transmission along the piping. In this modification, there will not normally need to be any actuation unit although this may be provided if desired to effect or control the relative movement between the duct parts. If desired, there may be provided a gimbal system to transmit end thrusts from the first duct part to the second duct part or vice versa.

Figure 3:
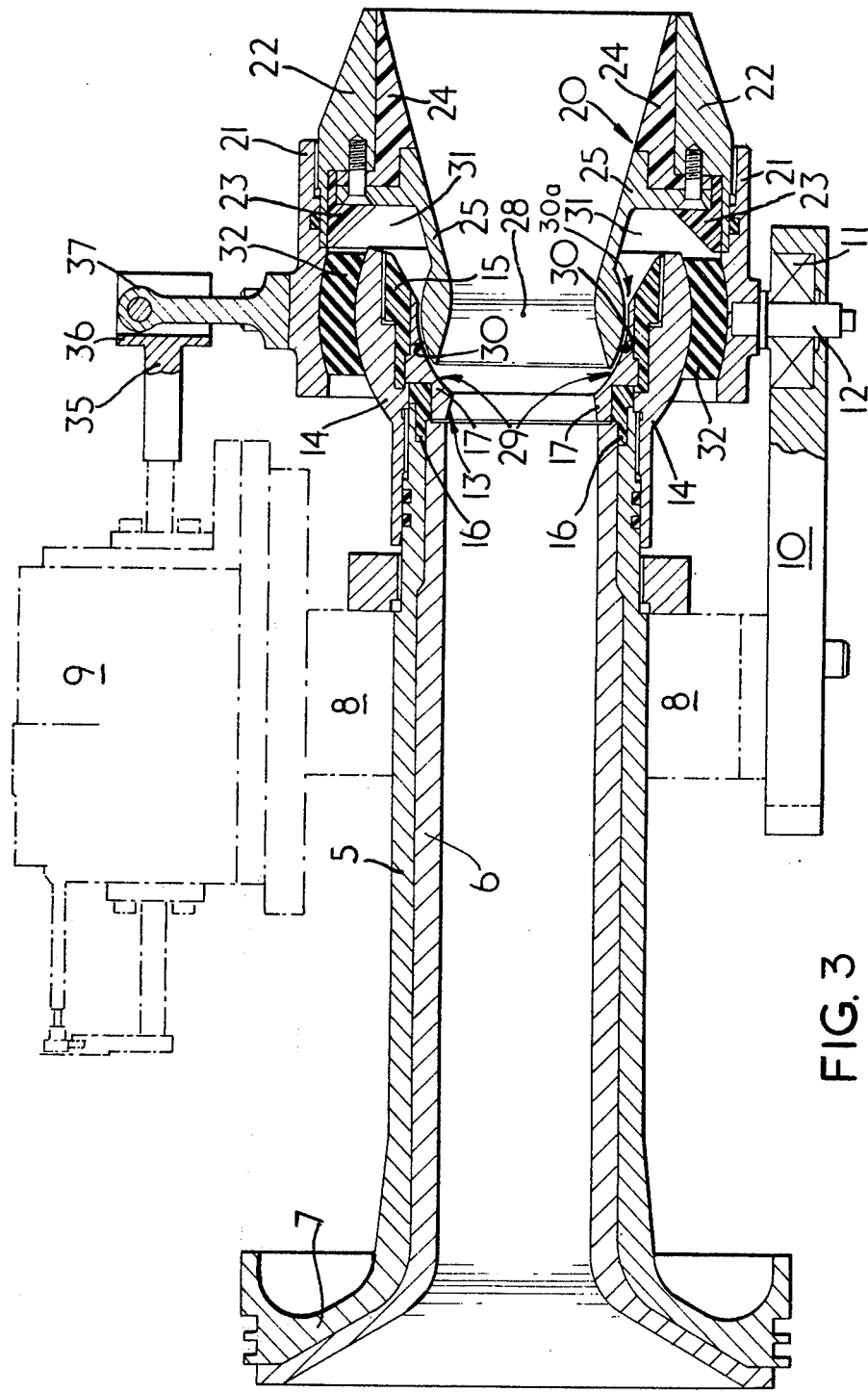
FIG. 3 is a section similar to FIG. 2 illustrating a second embodiment.

In FIG. 3 the same reference numerals are used to identify the elements which appear in FIG. 2. In the FIG. 3 embodiment there is provided a secondary seal comprising an elastomeric strip 32 of which opposite sides are bonded to facing surfaces of the inner and outer nozzle parts 13 and 20. Thus, the radially outer surface of the support 14 is convex about the center 28, and the facing portion of the radially inner surface of the support ring 21 is concave about the center 28. The respective convex and concave surfaces of the parts 14 and 21 are symmetrical about the plane perpendicular to the longitudinal axis of the nozzle and containing the point 28. The elastomeric strip 32 is bonded between these surfaces, and is thereby placed in shear strain upon angular adjustment between the nozzle parts 13 and 20. The elastomeric strip 32 provides a complete seal and one that is not subjected to frictional resistance, or to a degradation of sliding surfaces. The only resistance offered to relative movement is the resistance of the elastomer, and the only energy loss in the seal is the internal hysteresis of the elastomer.

It should be noted that the primary proximity seal 30a affords some protection of the secondary seal from exhaust gases, and although some high temperature and erosive gas will enter the cavity 31, the substantial thickness of the strip 32 ensures that extreme conditions will be required over a protracted period of time to penetrate the seal provided by the strip 32.

In use, the axially nozzle part 20 is angularly adjusted with respect to the inner nozzle part 13 and the blast pipe 5 to provide the required thrust vector, all in the same manner as described with reference to FIG. 2. In the FIG. 3 embodiment the elastomeric block will deform in shear but maintain a perfect seal between parts 13 and 20.

What is claimed is:

1. A flexible duct assembly for high temperature gases comprising axially first and second duct parts, a mounting system adjustably supporting the second duct part with respect to the first about a center located on the longitudinal axis of the duct assembly, generally axially extending portions on said duct parts, which portions interfit to provide a first pair of radially facing surfaces and a second pair of such surfaces located radially outwardly from the first, said axially extending portions including an annular axial extension on the first duct part extending into an annular channel on the second duct part, a radially inwardly facing surface of the extension providing a surface of said pair and a radially outwardly facing surface of the extension providing a surface of the second pair, the surfaces of the first pair being complementary and relatively movable, there being a primary seal between the surfaces of the first pair and an annular block of elastomeric material bonded between the surfaces of the second pair so as to present a major thickness against passage of gases between the surfaces of the second pair and so as to be deformable in shear upon adjustment of the second duct part relative to the first, the block being afforded protection from the interior of the duct assembly by the primary seal.

2. A flexible duct assembly according to claim 1 wherein the primary seal is constituted by complementary frusto-concavo and frusto-convexo surfaces centered upon said center.

3. A flexible duct assembly according to claim 1 wherein the mounting system comprises a gimbal ring centered upon said center to permit angular adjustment of the second duct part with respect to the first duct part, and actuation means for providing and controlling said angular adjustment.

4. A flexible duct assembly according to claim 1 wherein the flexible duct assembly constitutes an exhaust nozzle assembly, the first duct part is an axially inner nozzle part, and the second duct part is an axially outer nozzle part.

5. A flexible duct assembly as recited in claim 4 wherein said flexible duct assembly comprises a rocket motor.

6. A duct assembly as claimed in claim 1 wherein the surfaces of the second pair are frusto-concavo and frusto-convexo and are symmetrical about a plane perpendicular to said axis and including said center.

7. A duct assembly as claimed in claim 1 wherein said block is symmetrical about a plane perpendicular to said axis and including said center.

8. In a rocket motor a flexible duct assembly for high temperature gases comprising axially first and second duct parts, a mounting system adjustably supporting the second duct part with respect to the first about a center located on the longitudinal axis of the duct assembly, generally axially extending portions on said duct parts, which protions interfit to provide a first pair of radially facing surfaces and a second pair of such surfaces located radially outwardly from the first said axially extending portions including an annular axial extension on the first duct part extending into an annular channel on the second duct part, a radially inwardly facing surface of the extension providing a surface of said first pair and a radially outwardly facing surface of the extension providing a surface of the second pair, the surfaces of the first pair being complementary and relatively movable, there being a primary seal between the surfaces of the first pair and an annular block of elastomeric material bonded between the surfaces of the second pair so as to present a major thickness against passage of gases between the surfaces of the second pair and so as to be deformable in shear upon adjustment of the second duct part relative to the first, the block being afforded protection from the interior of the duct assembly by the primary seal.

\* \* \* \* \*